(12) United States Patent
Spillman et al.

(10) Patent No.: US 6,245,464 B1
(45) Date of Patent: Jun. 12, 2001

(54) HERMETICALLY SEALED LITHIUM-ION SECONDARY ELECTROCHEMICAL CELL

(75) Inventors: David M. Spillman, Tonawanda; Hong Gan; Esther S. Takeuchi, both of East Amherst, all of NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/211,419

(22) Filed: Dec. 15, 1998

Related U.S. Application Data

(60) Provisional application No. 60/101,218, filed on Sep. 21, 1998.

(51) Int. Cl.$^7$ ................................................. H01M 10/40
(52) U.S. Cl. .......................... 429/332; 429/176; 429/331; 429/326; 429/231.8; 429/218.1
(58) Field of Search .................................. 429/332, 176, 429/331, 326, 231.8, 218.1

(56) References Cited

U.S. PATENT DOCUMENTS

| | | | |
|---|---|---|---|
| 4,252,876 | 2/1981 | Koch | 429/197 |
| 4,802,275 | 2/1989 | Freluche | 29/623.4 |
| 4,863,815 | 9/1989 | Chang et al. | 429/94 |
| 4,957,833 | 9/1990 | Daifuku et al. | 429/197 |
| 5,053,297 | 10/1991 | Yamahira et al. | 429/194 |
| 5,250,373 | 10/1993 | Muffoletto et al. | 429/161 |
| 5,256,504 | 10/1993 | Okuno et al. | 429/197 |
| 5,310,553 | 5/1994 | Simon et al. | 429/212 |
| 5,439,760 | 8/1995 | Howard et al. | 429/94 |
| 5,443,928 | 8/1995 | Takeuchi et al. | 429/218 |
| 5,449,577 | 9/1995 | Dahn et al. | 429/94 |
| 5,474,862 | 12/1995 | Okuno et al. | 429/197 |
| 5,484,669 | 1/1996 | Okuno et al. | 429/194 |
| 5,486,215 | 1/1996 | Kelm et al. | 29/623.1 |
| 5,498,492 | 3/1996 | Hara et al. | 429/212 |
| 5,514,488 | 5/1996 | Hake et al. | 429/122 |
| 5,523,179 | 6/1996 | Chu | 429/104 |
| 5,525,443 | 6/1996 | Okuno et al. | 429/194 |
| 5,561,006 | 10/1996 | Lecerf et al. | 429/218 |
| 5,571,632 | 11/1996 | Teramoto | 429/94 |
| 5,589,299 | 12/1996 | Yamada et al. | 429/218 |
| 5,595,839 | 1/1997 | Hossain | 429/210 |
| 5,599,435 | 2/1997 | Li et al. | 205/59 |
| 5,603,737 | 2/1997 | Narincic et al. | 29/23.1 |
| 5,624,606 | 4/1997 | Wilson et al. | 252/506 |
| 5,626,981 | 5/1997 | Simon et al. | 429/105 |
| 5,660,951 | 8/1997 | Yoshida | 429/218 |
| 5,677,086 | 10/1997 | Satoh et al. | 429/223 |
| 5,712,059 | 1/1998 | Barker et al. | 429/197 |
| 5,714,280 | * 2/1998 | Nakano et al. | |
| 5,750,286 | 5/1998 | Paulot et al. | 429/211 |
| 6,054,010 | * 4/2000 | Tanaka et al. | |

FOREIGN PATENT DOCUMENTS

| | | | |
|---|---|---|---|
| 0690520A1 | 3/1994 | (EP) | H01M/10/04 |
| 01128371 | 5/1989 | (JP) | H01M/10/40 |

OTHER PUBLICATIONS

The Role Of Magnetic Susceptibility In Magnetic Resonance Imaging: Magnetic Field Compatibility Of The First And Second Kinds; John Schenck General Electric Corporate Research and Development Center; Schenectady, New York (No Date).

* cited by examiner

*Primary Examiner*—John S. Maples
(74) *Attorney, Agent, or Firm*—Hodgson Russ LLP

(57) ABSTRACT

A rechargeable alkali metal electrochemical cell, and preferably a lithium-ion secondary cell, constructed of low magnetic susceptibility materials, is described. The nonmagnetic characteristics enable the secondary cell to be used within the confines of a Magnetic Resonance Imaging system. The cell includes an electrolyte solution comprising ethylene carbonate, dimethyl carbonate, ethylmethyl carbonate and diethyl carbonate.

27 Claims, 2 Drawing Sheets

HERMETICALLY SEALED LITHIUM-ION SECONDARY ELECTROCHEMICAL CELL

CROSS REFERENCE TO RELATED APPLICATION

The present application claims priority based on U.S. provisional application Ser. No. 60/101,218, filed Sep. 21, 1998.

BACKGROUND OF INVENTION

1. Field of the Invention

The present invention generally relates to the conversion of chemical energy to electrical energy, and more particularly, to a rechargeable alkali metal electrochemical cell, particularly a lithium-ion secondary cell, designed for use in the vicinity of a Magnetic Resonance Imaging (MRI) system.

2. Prior Art

Lithium secondary cells have been under development for many years. Early efforts focused on the use of a lithium anode coupled with metal oxide and metal sulfide cathode materials such as manganese dioxide, titanium disulfide, and others. Despite the enormous amount of research performed on lithium secondary systems, they have not found widespread commercial use. Of concern are the inherent safety problems associated with them. During use, lithium plating can occur in an undesirable manner with dendritic lithium penetrating through the separator and short circuiting the cell. In addition to rendering the cell inoperative, this condition can cause the cell to vent or, in extreme cases, to explode.

During the past decade, increased attention has focused on the use of electrode materials which are capable of more effectively intercalating and de-intercalating lithium ions than the previously used metal oxides and metal sulfides. Cells incorporating such second generation electrode materials are typically referred to as lithium-ion or lithium-rocking chair systems. Although the energy density of these secondary cells is lower than that of primary cells containing lithium metal anodes, they exhibit a higher open circuit voltage, an acceptably high operating voltage and, in many cases, equivalent or better rate capability than many previously developed lithium secondary systems. Most importantly, their safety is generally accepted to be much better.

Presently, lithium-ion secondary cells are used in a large number of commercial applications including telephones, camcorders and other portable electronic equipment. They have been made in a variety of shapes, sizes and configurations including coin, button, cylindrical and prismatic cells. There are several other applications, however, for which rechargeable lithium cells and, in particular, lithium-ion secondary cells may be used but for which present day constructions are unsuitable. Such applications include medical instruments, implantable medical devices and surgical tools.

For many of these applications, the use of prior art lithium-ion secondary cells is unacceptable due to their shape and construction. For instance, modern technology enables surgeons to operate within the confines of an MRI system. One requirement for using battery powered surgical instruments and tools within or near this equipment is that they have as low a magnetic susceptibility as possible so as not to distort the visual image provided by the MRI system to the surgeon. Because present day lithium-ion cells are constructed using a nickel plated steel case, they are too magnetic; therefore, they cannot be used in the vicinity of an MRI system. Also, many implantable devices such as cardiac defibrillators, left-ventricular assist devices, implantable neurostimulators and the like require the use of a hermetically sealed power source. Present day lithium-ion cells are not hermetically sealed but are crimp sealed, precluding their use in these types of applications. Furthermore, in certain types of medical applications, prismatic cells which are sized and shaped for use within the human body are most preferred.

Accordingly, there exists the need for lithium-ion secondary cells which are, among other things, hermetic, have a shape suitable for use with medical instruments, implantable medical devices, surgical tools and the like, and, preferably, have a magnetic susceptibility that makes them acceptable for use in the vicinity of an MRI system.

SUMMARY OF THE INVENTION

The object of the present invention is, therefore, to provide a hermetic lithium-ion secondary cell suitable for powering medical instruments, implantable medical devices, surgical tools and the like, and which has been constructed of low magnetic susceptibility materials. The non-magnetic characteristics enable the secondary cell to be used within the confines of a Magnetic Resonance Imaging system.

These and other objects of the present invention will become increasingly more apparent to those skilled in the art by reference to the following description and to the appended drawings.

DETAILED DESCRIPTION OF THE DRAWINGS

DETAILED DESCRIPTION OF THE PREFERRED EMBODIMENTS

Figure 1:
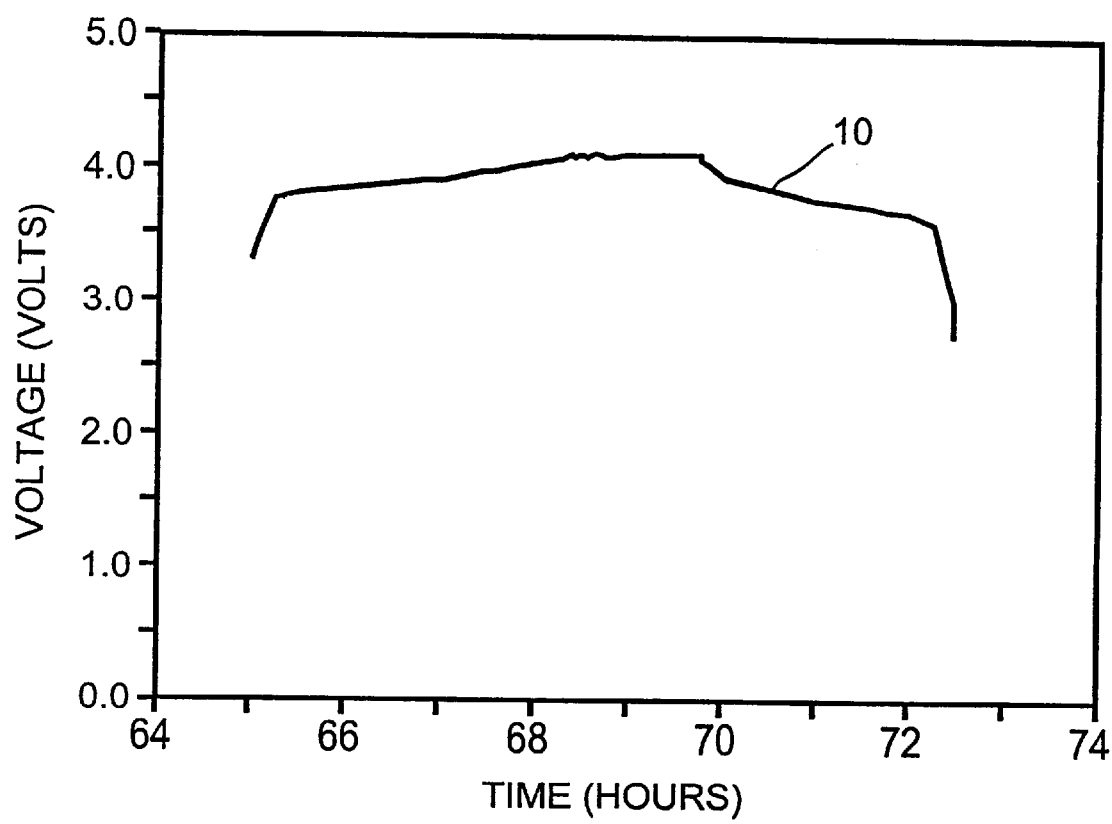
FIG. 1 is a graph constructed from the charge and discharge cycle of a representative lithium-ion secondary cell constructed according to the present invention.

A secondary electrochemical cell constructed according to the present invention includes an anode active material selected from Groups IA, IIA, or IIIB of the Periodic Table of Elements, including the alkali metals lithium, sodium, potassium, etc. The preferred anode active material comprises lithium.

In secondary electrochemical systems, the anode electrode comprises a material capable of intercalating and de-intercalating the alkali metal, and preferably lithium. A carbonaceous anode comprising any of the various forms of carbon (e.g., coke, graphite, acetylene black, carbon black, glassy carbon, pitch carbon, synthetic carbon, mesocarbon microbeads, and mixtures thereof) which are capable of reversibly retaining the lithium species, is preferred. Graphite is particularly preferred due to its relatively high lithium-retention capacity. Regardless of the form of the carbon (except for mesocarbon microbeads), fibers of the carbonaceous material are particularly advantageous because the fibers have excellent mechanical properties which permit them to be fabricated into rigid electrodes that are capable of withstanding degradation during repeated charge/discharge cycling. Moreover, the high surface area of carbon fibers allows for rapid charge/discharge rates. A preferred carbonaceous material for the anode of a secondary electrochemical cell is described in U.S. Pat. No. 5,443,928 to Takeuchi et al., which is assigned to the assignee of the present invention and incorporated herein by reference.

A typical secondary cell anode is fabricated by mixing about 90 to 97 weight percent graphite with about 3 to 10 weight percent of a binder material which is preferably a fluoro-resin powder such as polytetrafluoroethylene (PTFE), polyvinylidene fluoride (PVDF), polyethylenetetrafluoroethylene (ETFE), a polyamide or a polyimide, and mixtures thereof. To form an anode electrode, this active admixture is contacted to a metallic current collector. The metallic current collector is usually made from a thin foil of copper, nickel, nickel plated steel, stainless steel or titanium, with copper being preferred. Depending on the degree of magnetism required for the cell, other current collector materials may be used and the current collector may also be chemically etched, perforated, or of expanded metal screen. The anode current collector may or may not be coated or treated to prevent corrosion. The carbonaceous anode mixture may be associated with the current collector by casting, pressing, rolling or otherwise contacting the active admixture thereto.

The anode electrode further has a metallic lead welded to the anode current collector. The lead material may consist of copper, nickel, nickel plated steel, stainless steel or titanium, depending on the anode current collector material used, the case and lid materials used and the degree of magnetic susceptibility required for the cell. The anode lead may be welded to the current collector using various methods including, but not limited to, resistance welding, plasma welding, ultrasonic welding or laser welding. The anode lead is then weld contacted to a cell case of conductive metal in a case-negative electrical configuration, as will be described hereinafter. Alternatively, the anode may be formed in some other geometry, such as a bobbin shape, cylinder or pellet to allow an alternate low surface cell design.

The cathode of a secondary cell according to the present invention includes a metal oxide, a metal sulfide, a metal selenide or a metal telluride of a transition metal element. Such metals include vanadium, titanium, chromium, copper, molybdenum, niobium, iron, nickel, cobalt and manganese. The cathode active material is preferably lithiated when the cell is manufactured and may or may not be used in combination with other metal oxide or metal sulfide materials. Lithiated materials are preferred because they are stable in air and readily handled. The more preferred oxides include $LiNiO_2$, $LiMn_2O_4$, $LiCoO_2$, $LiCo_{0.92}Sn_{0.08}O_2$ and $LiCo_{1-x}Ni_xO_2$. Among these, lithium cobalt oxide is most preferred due to its relatively high voltage, high rate capability, high energy density and good cycle life; however, any material which is suitable for intercalating and de-intercalating lithium ions and which is stable within the cell environment will suffice.

Before fabrication into a cathode electrode for incorporation into a lithium-ion secondary cell, the lithiated active material is preferably mixed with a conductive additive. Suitable conductive additives include acetylene black, carbon black and/or graphite. Metals such as nickel, aluminum, titanium and stainless steel in powder form are also useful as conductive diluents when mixed with the above listed active materials. The cathode electrode further comprises a fluoro-resin binder, preferably in a powder form, such as PTFE, PVDF, ETFE, a polyamide or a polyimide, and mixtures thereof.

To form a cathode electrode, the cathode active material, conductive agent and the binder material are mixed and subsequently contacted to a metallic current collector. The current collector is usually made from a thin metallic foil. Aluminum is a particularly preferred material for the cathode current collector since it is very conductive, has a relatively low magnetic susceptibility and is relatively inexpensive and stable within the confines of the cell environment. Additionally, other forms of a current collector may be used including a chemically etched, perforated or expanded metal screen, depending on the particular requirements of the processes used to manufacture the cell. The cathode current collector may or may not be coated or treated to prevent corrosion.

The inclusion of a lead on the cathode current collector may be desirable for contact to the terminal pin; however, this is not necessary. In some cases, the cathode current collector may be welded directly to the terminal pin. Such a construction is shown in U.S. Pat. No. 5,750,286 to Paulot et al., which is assigned to the assignee of the present invention and incorporated herein by reference. In cases where a cathode lead is used, the lead material is usually aluminum or a high ferritic stainless steel such as 29-4-2 stainless steel, and is welded to the current collector by one of several methods including resistance welding, plasma welding, ultrasonic welding or laser welding.

To discharge a secondary cell constructed according to the present invention, lithium-ions comprising the lithiated cathode active material are intercalated into the carbonaceous anode by applying an externally generated electrical potential to recharge the cell. The applied recharging electrical potential serves to draw lithium ions from the cathode material, through the electrolyte and into the carbonaceous anode to saturate the carbon comprising the anode. The resulting $Li_xC_6$ electrode can have an x ranging between 0.1 and 1.0. The cell is then provided with an electrical potential and discharged in a normal manner.

An alternate secondary cell construction comprises intercalating the carbonaceous material with the active alkali material before the anode is incorporated into the cell. In this case, the cathode body can be solid and comprise, but not be limited to, such materials as manganese dioxide, silver vanadium oxide, copper silver vanadium oxide, titanium disulfide, copper oxide, copper sulfide, iron sulfide, iron disulfide and fluorinated carbon. However, this approach is compromised by the problems associated with handling lithiated carbon outside of the cell. Lithiated carbon tends to react when contacted by air.

The secondary cell of the present invention includes a separator to provide physical segregation between the anode and cathode active electrodes. The separator is of an electrically insulative material to prevent an internal electrical short circuit between the electrodes, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. The form of the separator typically is a sheet which is placed between the anode and cathode electrodes. Such is the case when the anode is folded in a serpentine-like structure with a plurality of cathode plates disposed intermediate the anode folds in a multiplate design and received in a cell casing or when the electrode combination is rolled or otherwise formed into either a cylindrical or flattened "jellyroll" configuration.

Illustrative separator materials include fabrics woven from fluoropolymeric fibers of polyethylenetetrafluoroethylene and polyethylenechlorotrifluoroethylene used either alone or laminated with a fluoropolymeric microporous film. Other suitable separator materials include non-woven glass, polypropylene, polyethylene, polyamides, polyimides, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The choice of an electrolyte solvent system for activating a rechargeable alkali metal electrochemical cell, and particularly a fully charged lithium-ion secondary cell is very limited due to the high potential of the cathode material (up to 4.3V vs. Li/Li$^+$ for Li$_{1-x}$CoO$_2$) and the low potential of the anode material (0.01V vs. Li/Li$^+$ for graphite). Suitable nonaqueous electrolytes are comprised of an inorganic salt dissolved in a nonaqueous solvent and more preferably an alkali metal salt dissolved in a mixture of organic carbonate solvents comprising dialkyl (non-cyclic) carbonates selected from dimethyl carbonate (DMC), diethyl carbonate (DEC), dipropyl carbonate (DPC), ethylmethyl carbonate (EMC), methylpropyl carbonate (MPC) and ethylpropyl carbonate (EPC), and mixtures thereof, and a cyclic carbonate selected from propylene carbonate (PC), ethylene carbonate (EC), butylene carbonate (BC) and vinylene carbonate (VC), and mixtures thereof. Organic carbonates are generally used in the electrolyte solvent system for such battery chemistries because they exhibit high oxidative stability toward cathode materials and good kinetic stability toward anode materials. The ester γ-butyrolactone is also a useful solvent for activating a lithium-ion secondary cell according to the present invention.

Preferred electrolytes comprise solvent mixtures of EC:DMC:EMC:DEC. Preferred volume percent ranges for the various carbonate solvents include EC in the range of about 10% to about 50%; DMC in the range of about 5% to about 75%; EMC in the range of about 5% to about 50%; and DEC in the range of about 3% to about 45%. Electrolytes containing this quaternary carbonate mixture exhibit freezing points below −50° C., and lithium-ion secondary cells activated with such carbonate solvent mixtures have very good cycling behavior at room temperature as well as very good discharge and charge/discharge cycling behavior at temperatures below −20° C. A most preferred electrolyte solvent system comprises a volume percent mixture of about 45% EC, about 22% DMC, about 24.8% EMC and about 8.2% DEC.

Known lithium salts that are useful as a vehicle for transport of alkali metal ions from the anode to the cathode, and back again include LiPF$_6$, LiBF$_4$, LiAsF$_6$, LiSbF$_6$, LiClO$_4$, LiAlCl$_4$, LiGaCl$_4$, LiC(SO$_2$CF$_3$)$_3$, LiNO$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiB(C$_6$H$_5$)$_4$ and LiCF$_3$SO$_3$, and mixtures thereof. Suitable salt concentrations typically range between about 0.8 to 1.5 molar. For a more detailed description of a carbonate based solvent system and an electrolyte including the same for activating a lithium-ion secondary cell, reference is made to U.S. application Ser. No. 09/133,799, which is assigned to the assignee of the present invention and incorporated herein by reference.

Unlike prior-art lithium secondary cells in which the case is constructed of nickel plated steel, lithium-ion secondary cells constructed according to the present invention are housed in a case constructed of Type 304 austenitic stainless steel and variants such as 304L, Type 316 austenitic stainless steel and variants such as 316L, or titanium and its alloys. It is known that Type 304, 304L, 316 and 316L stainless steel have a magnetic susceptibility of about 3,520 to 6,700×10$^6$ while titanium has a magnetic susceptibility of about 182× 10$^6$. The stainless steel may be in a fully annealed, partially annealed or unannealed state although an annealed state is preferred. In the case of stainless steel, the case is annealed by heating in hydrogen, vacuum or an other suitable non-oxidizing atmosphere to a temperature of about 1,040° C. to about 1,090° C., followed by rapid cooling in the same or other suitable non-oxidizing atmosphere. The rate of cooling through the temperature range of about 780° C. to about 450° C. is critical to the avoidance of detrimental changes in alloy microstructure. For example, in casings comprised of 304L stainless steel, cooling through the abovementioned temperature range in about 15 minutes or less avoids all detrimental changes.

The use of these materials greatly reduces the level of magnetism associated with the casing in comparison to prior art cells, which are housed in a nickel plated steel container. For a more thorough understanding of the magnetic susceptibility of various materials used to construct the present cell, reference is made to a paper authored by John Schneck of General Electric Corporate Research and Development Center, Schenectady, N.Y. 12309, titled "The Role of Magnetic Susceptibility In Magnetic Resonance Imagery: Magnetic Field Compatibility of the First and Second Kinds". The disclosure of that paper is incorporated herein by reference.

The present cell includes a hermetic header assembly that consists of a lid, a glassed preform and a terminal pin. The lid material is preferably identical to the case material, i.e. stainless steel or titanium. The terminal pin must be stable and corrosion resistant at the high cell voltage which is characteristic of the lithium-ion system. Two materials which may be used include 29-4-C stainless steel and molybdenum. The glass preform must also be corrosion resistant and possess a thermal expansion coefficient that allows it to hermetically seal to the lid and terminal pin materials. Suitable glasses may include TA-23, CABAL12, FUSITE 425 or FUSITE 435.

The welding method for connecting the cathode current collector and the cathode lead to the terminal pin include resistance welding, plasma welding, ultrasonic welding or laser welding. In order to facilitate welding, the pin may be rounded, flattened, chemically etched, mechanically roughened, or partially split, depending upon the thickness of the terminal pin, the thickness of the current collector foil or screen and the geometry of the cell design. Additionally, a tubular couple may be welded to the terminal pin with the electrode assembly subsequently welded to the tubular couple. This latter terminal pin construction is shown in U.S. Pat. No. 5,250,373 to Muffoletto et al., which is assigned to the assignee of the present invention and incorporated herein by reference.

According to one embodiment of the present invention, the anode assembly, the separator and the cathode assembly are wound around a mandrel into a prismatic spiral or elongated "jellyroll" configuration. In some instances, the electrode assembly may be wound into an elliptical configuration and then flattened into the prismatic spiral shape to conform to the geometry of the case enclosure. A cylindrical jellyroll electrode assembly is also useful with the present invention. Regardless of the shape of the electrode assembly, in order to provide for maximum safety in the cell design, the height and length of the cathode electrode comprising the lithiated material is smaller than that of the anode electrode comprising the carbonaceous material such that the cathode active material is completely bounded by the anode active material to thereby prevent lithium plating.

In the preferred construction of the present cell, the lithiated positive electrode material is provided in a sheet form having spaced apart first and second ends meeting with first and second edges extending to opposed sides to provide the positive electrode having a width between the edges, a length between the ends and a thickness between the sides. The carbonaceous negative electrode is also provided in a sheet form having spaced apart first and second ends meeting with first and second edges extending to opposed sides to provide the negative electrode having a width between the edges, a length between the ends and a thickness between the sides.

To provide the electrode assembly, the negative electrode is provided side-by-side with the positive electrode having an intermediate separator such that the length and width of the negative electrode extend beyond the length and width of the positive electrode to provide the positive electrode bounded by the negative electrode. Should the electrochemically active cathode material laminated to the cathode current collector not be completely opposed by electrochemically active anode material laminated to the anode current collector, the possibility exists that lithium metal will plate within the cell. This is undesirable as it may compromise the performance or the safety of the cell. Finally, it should be noted that the separator length and width extend beyond that of the anode electrode. The negative and the positive electrodes are then wound on a mandrel which can serve as the terminal pin for one of them, preferably the cathode electrode. For a more detailed description of the construction of the present electrode assembly, reference is made to the simultaneously filed patent application titled "Lithium-Ion Secondary Electrochemical Cell", claiming priority based on U.S. provisional application Ser. No. 60/101,175, filed Sep. 21, 1998 which is assigned to the assignee of the present invention and incorporated herein by reference.

After the electrode assembly is wound and inserted into the casing, the anode lead is welded to the interior of the casing at one or more of a number of locations. Depending on the cell design, the anode lead may be welded to the inside of the case or to the underside of the header. Additionally, the anode lead may be pinched between the lid and the case and subsequently fused as the lid and case are hermetically welded together. Methods of welding the anode lead to the case, to the lid or to both include resistance welding, plasma welding, ultrasonic welding and laser welding. Regardless of where the anode lead is welded to the case, the header assembly is hermetically welded to the case.

An alternate method of assembling the cell involves winding the anode and cathode electrodes on a mandrel, removing the mandrel from the wind and inserting the wound electrode assembly into a suitably shaped cell case or container. In such a design, an elongated terminal pin is not required. Instead, a cathode lead is welded to the current collector by one of numerous welding methods such as resistance welding, plasma welding, ultrasonic welding or laser welding.

Regardless of the winding method, the cell is thereafter filled with the electrolyte solution described hereinabove, and hermetically sealed such as by close-welding a stainless steel ball over the fill hole, but not limited thereto. This above assembly describes a case-negative cell which is the preferred construction for the lithium-ion secondary cell of the present invention. As is well known to those skilled in the art, the electrochemical system of the present invention can also be constructed in a case-positive configuration.

Thus, hermetic, lithium-ion secondary cells constructed according to the present invention preferably comprise a casing of a material having a magnetic susceptibility of at least about $182 \times 10^6$, or greater; a carbonaceous material as a negative electrode active material contacted to a copper current collector; lithium cobalt oxide as a positive electrode active material contacted to an aluminum current collector, wherein the negative electrode and the positive electrode are electrochemically associated with each other housed in the casing; and an electrolyte solution activating the negative and the positive electrodes, the electrolyte solution including an alkali metal salt dissolved in a quaternary, nonaqueous carbonate solvent mixture consisting of about 45% ethylene carbonate, 22% dimethyl carbonate, about 24.8% ethylmethyl carbonate and about 8.2% diethyl carbonate, by volume, and wherein a periphery of the positive electrode is completely bounded by a periphery of the negative electrode to prevent lithium from plating as the cell is repeatedly cycled between a charged and a discharged condition. The casing is preferably of a cylindrical or prismatic shape. Such a cell exhibits greatly reduced magnetic susceptibility in comparison to prior art lithium secondary cells, without compromising cycling efficiency.

Figure 2:
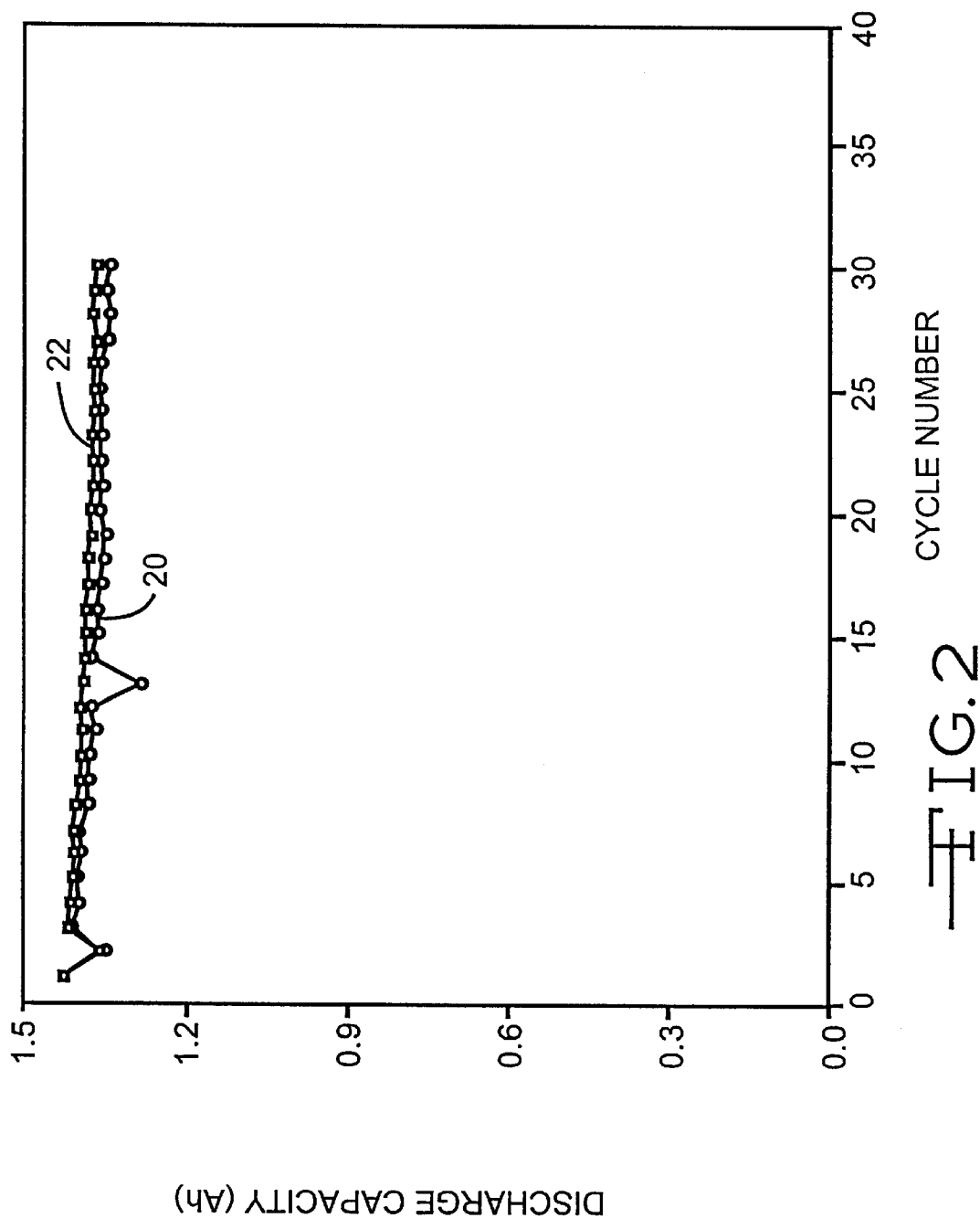
FIG. 2 is a graph constructed from representative lithium-ion secondary cells constructed according to the present invention and cycled numerous times between a charged and a discharged state at 22° C. and 37° C., respectfully.

Several cells constructed according to the present invention having a prismatic spiral configuration were subjected to numerous charge and discharge cycles. A representative plot of a single discharge and charge cycle is shown in FIG. 1. As illustrated by curve 10, the traditional charge and voltage discharge profile is observed wherein the lithium-ion cell is charged to about 4.1 volts and subsequently discharged to about 2.75 volts. When discharged, the cell provided high operating voltage throughout. Curve 20 in FIG. 2 was constructed from the cycling discharge of a representative one of the present invention lithium-ion cells discharged at 22° C. while curve 22 in that figure was constructed from a second one of the cells cycled at 37° C. Both cells exhibit a relatively low fade rate.

It is appreciated that various modifications to the present inventive concepts described herein may be apparent to those of ordinary skill in the art without disparting from the spirit and scope of the present invention as defined by the herein appended claims.

What is claimed is:

1. A secondary electrochemical cell, which comprises:
   a) a casing;
   b) a negative electrode comprising a negative electrode active material which intercalates with an alkali metal;
   c) a positive electrode comprising a positive electrode active material which intercalates with the alkali metal, wherein the negative electrode and the positive electrode are electrochemically associated with each other housed in the casing, and wherein a periphery of the positive electrode is completely bounded by a periphery of the negative electrode to prevent alkali metal from plating as the cell is repeatedly cycled between a charged and a discharged condition; and
   d) an electrolyte solution activating the negative and positive electrodes, wherein the electrolyte comprises about 45% ethylene carbonate, about 22% dimethyl carbonate, about 24.8% ethylmethyl carbonate and about 8.2% diethyl carbonate, by volume.

2. The electrochemical cell of claim 1 wherein the casing is of a conductive material selected from the group consisting of Type 304 austenitic stainless steel, Type 304L austenitic stainless steel, Type 316 austenitic stainless steel, Type 316L austenitic stainless steel, titanium and alloys of titanium.

3. The electrochemical cell of claim 1 wherein the casing is of annealed stainless steel provided by heating the casing in an atmosphere selected from the group consisting of a vacuum, hydrogen, nitrogen, argon, helium, and mixtures thereof, to a temperature of about 1,040° C. to about 1,090° C., followed by cooling in the vacuum or an atmosphere selected from the group consisting of hydrogen, nitrogen, argon, helium, and mixtures thereof through a temperature range of about 780° C. to about 450° C. in about fifteen minutes, or less.

4. The electrochemical cell of claim 1 wherein the positive electrode is provided in a sheet form having spaced apart first and second ends meeting with first and second edges extending to opposed sides to provide the positive electrode having a width between the edges, a length between the ends and a thickness between the sides, and the negative electrode is provided in a sheet form having spaced apart first and second ends meeting with first and second edges extending to opposed sides to provide the negative electrode having a width between the edges, a length between the ends and a thickness between the sides, and wherein the negative electrode is provided side-by-side with the positive electrode having an intermediate separator such that the length and width of the negative electrode extend beyond the length and width of the positive electrode to provide the positive electrode bounded by the negative electrode.

5. The electrochemical cell of claim 1 wherein the alkali metal is lithium.

6. The electrochemical cell of claim 1 wherein the negative electrode active material is selected from the group consisting of coke, carbon black, graphite, acetylene black, carbon fibers, pitch carbon, synthetic carbon, mesocarbon microbeads, glassy carbon, and mixtures thereof.

7. The electrochemical cell of claim 1 wherein the negative electrode active material is contacted to a negative current collector selected from the group consisting of copper, nickel, nickel plated steel, stainless steel and titanium.

8. The electrochemical cell of claim 7 wherein the negative electrode current collection is in a form selected from the group consisting of foil, perforated screen, chemically etched screen and expanded screen.

9. The electrochemical cell of claim 1 wherein the negative electrode active material is mixed with a fluoro-resin binder.

10. The electrochemical cell of claim 1 wherein the positive electrode active material is selected from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

11. The electrochemical cell of claim 1 wherein the positive electrode active material is contacted to an aluminum current collector.

12. The electrochemical cell of claim 11 wherein the aluminum positive electrode current collector is in a form selected from the group consisting of foil, perforated screen, chemically etched screen and expanded screen.

13. The electrochemical cell of claim 1 wherein the positive electrode active material is mixed with a fluoro-resin binder.

14. The electrochemical cell of claim 1 wherein the positive electrode active material is mixed with a conductive additive selected from the group consisting of acetylene black, carbon black, graphite, nickel powder, aluminum powder, titanium powder, stainless steel powder, and mixtures thereof.

15. An electrochemical cell, which comprises:
   a) a casing of a material having a magnetic susceptibility of at least about $182 \times 10^6$, or greater;
   b) a negative electrode which intercalates with lithium;
   c) a positive electrode comprising a lithiated electrode active material, wherein the negative electrode and the positive electrode are electrochemically associated with each other housed in the casing; and
   d) an electrolyte solution activating the negative and the positive electrodes, the electrolyte including a lithium metal salt dissolved in a quaternary, nonaqueous carbonate solvent mixture consisting of about 45% ethylene carbonate, 22% dimethyl carbonate, about 24.8% ethylmethyl carbonate and about 8.2% diethyl carbonate, by volume.

16. The electrochemical cell of claim 15 wherein the lithium metal salt is selected from the-group consisting of $LiPF_6$, $LiBF_4$, $LiAsF_6$, $LiSbF_6$, $LiClO_4$, $LiAlCl_4$, $LiGaCl_4$, $LiNO_3$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$ and $LiCF_3SO_3$, and mixtures thereof.

17. A method for providing a secondary electrochemical cell, comprising the steps of:
   e) providing a casing of a material having a magnetic susceptibility of at least about $182 \times 106$, or greater;
   f) providing a negative electrode which intercalates with an alkali metal;
   g) providing a positive electrode comprising a positive electrode active material which intercalates with the alkali metal;
   h) housing the negative and the positive electrodes inside the casing electrochemically associated with each other and wherein a periphery of the positive electrode is completely bounded by a periphery of the negative electrode to prevent alkali metal from plating as the cell is repeatedly cycled between a charged and a discharged condition; and
   i) activating the negative and positive electrodes with an electrolyte comprising about 45% ethylene carbonate, about 22% dimethyl carbonate, about 24.8% ethylmethyl carbonate and about 8.2% diethyl carbonate, by volume.

18. The method of claim 17 including providing the casing of a conductive material selected from the group consisting of Type 304 austenitic stainless steel, Type 304L austenitic stainless steel, Type 316 austenitic stainless steel, Type 316L austenitic stainless steel, titanium and alloys of titanium.

19. The method of claim 17 including providing the casing of annealed stainless steel by heating the casing in an atmosphere selected from the group consisting of a vacuum, hydrogen, nitrogen, argon, helium, and mixtures thereof, to a temperature of about 1,040° C. to about 1,090° C., followed by cooling in the vacuum or an atmosphere selected from the group consisting of hydrogen, nitrogen, argon, helium, and mixtures thereof, through a temperature range of about 780° C. to about 450° C. in about fifteen minutes or less.

20. The method of claim 17 wherein the electrolyte includes an alkali metal salt selected from the group consisting of $LiPF_6$, $LiBF_4$, $LiAsF_6$, $LiSbF_6$, $LiClO_4$, $LiAlCl_4$, $LiGaCl_4$, $LiNO_2$, $LiC(SO_2CF_3)_3$, $LiN(SO_2CF_3)_2$, $LiSCN$, $LiO_3SCF_2CF_3$, $LiC_6F_5SO_3$, $LiO_2CCF_3$, $LiSO_3F$, $LiB(C_6H_5)_4$, $LiCF_3SO_3$, and mixtures thereof.

21. The method of claim 17 including providing the alkali metal as lithium.

22. The method of claim 17 including providing the negative electrode comprising a negative electrode active material selected from the group consisting of coke, carbon black, graphite, acetylene black, carbon fibers, pitch carbon, synthetic carbon, mesocarbon microbeads, glassy carbon, and mixtures thereof.

23. The method of claim 17 including contacting the negative active material to a negative electrode current collector selected from the group consisting of copper, nickel, nickel plated steel, stainless steel and titanium.

24. The method of claim 23 including providing the negative current collection in a form selected from the group consisting of foil, perforated screen, chemically etched screen and expanded screen.

25. The method of claim 17 including selecting the positive electrode active material from the group consisting of lithiated oxides, lithiated sulfides, lithiated selenides and lithiated tellurides of the group selected from vanadium, titanium, chromium, copper, molybdenum, niobium, iron, nickel, cobalt, manganese, and mixtures thereof.

26. The method of claim 17 including contacting the positive electrode active material to an aluminum current collector.

27. The method of claim 26 including providing the positive current collector in a form selected from the group consisting of foil, perforated screen, chemically etched screen and expanded screen.

* * * * *